June 22, 1954  R. J. BABBITT  2,681,625
MOLD FOR MAKING AND RELEASING DOUGHNUTS, COOKIES, AND THE LIKE
Filed Oct. 4, 1951

Raymond J. Babbitt
INVENTOR.

BY
*Attorneys*

Patented June 22, 1954

2,681,625

UNITED STATES PATENT OFFICE 2,681,625

MOLD FOR MAKING AND RELEASING DOUGHNUTS, COOKIES, AND THE LIKE

Raymond J. Babbitt, Cleveland, Ohio

Application October 4, 1951, Serial No. 249,739

2 Claims. (Cl. 107—47)

The present invention relates to certain new and useful improvements in culinary implements, generally speaking, and has more particular reference to food cutters, molds and shapers which, while usable in restaurants and many other lines and fields of endeavor, are principally adapted for practical and handy use in one's home kitchen to assist a user in molding and releasing doughnuts on the one hand, cookies on the other hand, or similar mold-shaped products.

The invention herein revealed, as stated, is characterized by a cup-shaped mold of desired depth having a rigid loop-shaped handle whose bight portion arches centrally over the closed top of the mold and whose end portions are integrated at diametrically opposite points with the perimeter portion of said mold. Inner cup means, or equivalent means, is provided and situated within the limits of the outer cup mold and is provided with a vertical axle forming pin mounted for free rotation in an axial bearing in the central top portion of the outer cup mold. A rotary operating knob is secured to the upper end of the axle or pin, is situated atop the mold and is spaced downwardly beneath the stated bight portion of said loop-shaped handle for easy finger or thumb tip operation.

The invention is carried out in two embodiments and the foregoing brief version thereof is generic. A species of the invention which may be conveniently called a doughnut maker or mold is one in which the inner molding cup is circular, non-circular, ornamental or otherwise and wherein the knob which turns the axle and inner cup is cruciform in configuration, said knob resting rotatably atop the central portion of the main or outer mold and being unique in that it embodies equidistant circumferentially spaced notches defining outstanding projections constituting finger-actuatable trip elements.

In respect to the other species, the inner cup or auxiliary mold is non-circular and is adapted to be of predetermined delineation or configuration, other than circular, the same serving in conjunction with the outer circular cup mold for cutting and shaping cookie components, said inner cup mold, axle and knob being detachable from the outer one so that the knob may be reattached to the axle and merely the inner cup mold and knob used individually for cutting a desired pattern from a larger sheet of cookie dough.

Other objects and advantages will become more readily apparent from the following description and the accompanying sheet of illustrative drawings.

In the accompanying sheet of drawings wherein like numerals are employed to designate like parts throughout the views.

Figure 3:
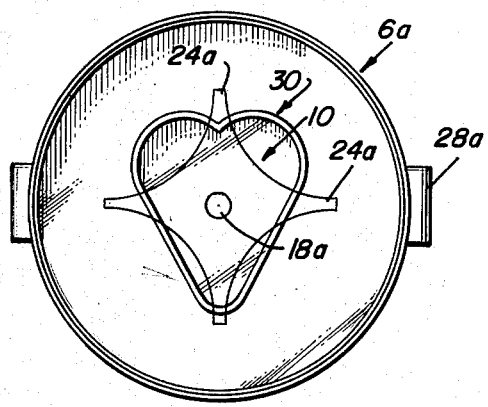
Figure 4:
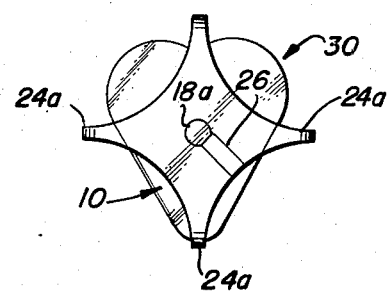

Figure 3 is a bottom plan view showing a similar arrangement but with a modified inner cup mold or cutter through the medium of which the center of a cookie is given an ornamental shape and the encircling portion is dislodged and released; and Figure 4 is a top plan view of the knob and inner cup mold assembled to form a cookie dough cutter or mold for making cookies of a shape corresponding to the cutter-mold.

Briefly summarized the invention has to do with separably interconnected inner and outer cup-shaped molds and, more particularly there is an outer circular cup mold having a marginal flange with one edge thinned to provide a cutting lip. Formed integrally with this mold is a one-piece rigid loop shaped handle extending from the top side and having end portions connected with diametrically opposite portions of said top, the intermediate portion of said handle bridging over said top side in spaced relation and providing a hand grip. The top is provided centrally with a bearing hole located directly beneath the central portion of the hand grip. The inner cup provides the product contacting, dislodging and releasing means and it is, of course, confined for rotation within the confines of the outer mold and is approximately a depth equalling the depth of the outer mold. It is provided centrally with an integral pin fitting removably and rotatably in and extending upwardly through the bearing hole and above the top of the mold. There is a one-piece finger actuated knob removably attached to the pin and this constitutes means for clampingly and rotatably maintaining the two molds in assembled relatively operable relationship.

It will be evident that the expressions "doughnut" and "cookie" are used advisably because as in other household molds it is obvious that the food product which is to be molded and cooked may be neither a doughnut nor a cookie but of some other similar food item. For example, one may, with the device as shown, conveniently mold and readily release or discharge meat cakes or patties, biscuits, potato cakes, and so on. However, and for convenience it seems sufficient to think of the structure in Figures 1 and 2 as pertaining to a "doughnut" shaping and releasing mold and the structures shown in Figures 3 and 4 as having to do with molding and making party-type cookies, say for card parties.

Figure 1:
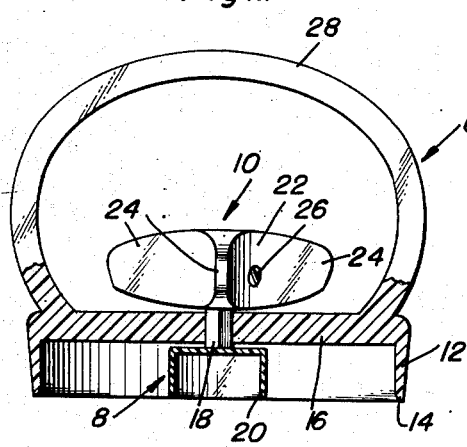
Figure 1 is a view partly in section and partly in elevation showing a doughnut or other food product shaping and releasing mold constructed in accordance with the principles of the present invention.
Figure 2:
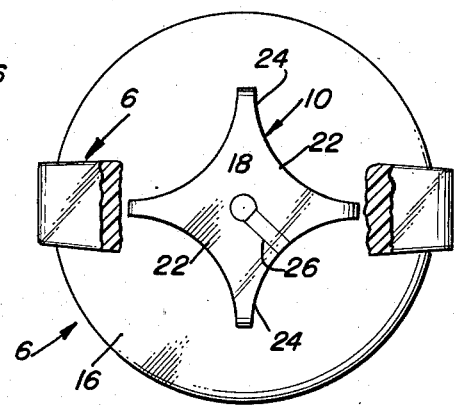
Figure 2 is a top plan view of the same with the bight portion of the loop-shaped handle broken away to uncover and show the underlying manually turned operating knob.

Attention is first invited therefore to Figures 1 and 2 wherein the main unit is denoted by the numeral 6, the auxiliary unit by the numeral 8 and the complemental unit by the numeral 10.

Unit 6 is of sheet material and is generally, but not necessarily, fashioned from a suitable grade of commercial plastics. It provides a cup-like receptacle which may be conveniently referred to as the main or outer mold or cup 12. The flange or rim of this is of annular form and the lip is thinned to provide an appropriate cutting edge 14. The disk-like top of the cup is essentially imperforate, relatively heavy as at 16 and is provided with a central bearing hole to accommodate a pin or turning axle 18 fixed to the inner circular cup mold 8. The latter is also of commercial plastics and, of course, is preferably circular in configuration and has a suitably shaped rim portion or wall 20. Unit 8 is readily applicable and removable in relation to unit 6 and it is turned relative to unit 6 by way of a special cruciform finger tip or thumb tip operating knob. Actually the knob is made up of circumferentially shaped arcuate recesses 22 forming intervening outstanding equidistant projections functioning as finger trips 24. The knob has a central bored hub portion which is fitted removably over the axle and is secured in any suitable manner thereto generally by way of a setscrew 26. The unit 6 also includes an arched or loop-shaped handle 28. In using this doughnut cutter and mold the steps consist in rolling the doughnut dough one-quarter of an inch to one-half inch thick. Then, using the device in the assembled form shown in Figure 1, the user cuts out the doughnut. The dough will almost always stick in the cups 12 and 8. Now, the user lifts the compacted or molded dough from the main dough batch. The next thing is to turn the operating knob 10 with a finger tip or alternatively the thumb tip while, with the same hand, catching hold of the handle 28. In other words, by holding the handle 28 and turning the knob 10 relative thereto the inner molding cup 8 rotates relative to the outer one thus releasing the dough ring into a pan or wherever it is wanted for cooking, this without extra handling. Of course, the chunk or piece of dough in the inner cup mold 18 will still stay therein and this means that it will be necessary to dig or dislodge this from the cup with a toothpick or the like. The center chunk as well as the annular portion may both be fried to make, from each cutting, a large doughnut and a small doughnut.

The same unit 6 is employed in Figure 3 and is here denoted by the numeral 6a for convenience of differentiation for in this form of the invention the structure is adapted to function as a cookie cutter. If desired, the outer cup may be shallower than the one shown in Figure 1. In any event, the cup or outer mold 6a is provided with a loop-shaped handle 28a. Means is also provided to accommodate the turnable axle or shaft 18a. Here the inner cutter-mold is also a smaller cup and it is denoted by the numeral 30. Instead of being circular it is of any other configuration, preferably a configuration of a predetermined character. Since cookies are often used at card parties and the like, it is obvious that this particular cutter comes in handy for making card party cookies. It follows that unit 6a is pressed down into the dough and two distinct portions are cut simultaneously. A portion which is molded in the main or principal cup 6a and a portion which is molded and shaped in the complemental or inner cup or mold 30. In this form of the invention it is obvious that the inner cup 30 need not necessarily turn relative to the main or principal cup 6a. Instead the user simply keeps the two units in the same relationship and forces them down into the dough cutting out two independent pieces of dough with the given shapes apparent. The same knob 10 is provided and it is, therefore, provided with circumferentially spaced finger trips or projections 24a. It is to be understood, however, that the inner cup 30, notwithstanding its irregular or non-circular shape is susceptible of turning the impacted dough for dislodging and releasing purposes. That is to say, the outer peripheral portion of the dough which is in the channel between the rim of the outer cup mold and that of the inner cup mold, unless it is too sticky in texture, will rotate and slide relative to the rim of the outer mold sufficient to release itself from the two molds.

If it is not desired to use the two units 6a and 30 in Figure 3, it is possible to merely use 30 and the knob 10 as a complete assembly as shown in Figure 4. In this arrangement the axle or pin 18 is slipped from its bearing and removed from the main cup 6a and the knob is temporarily detached and then the knob is re-attached, as shown in Figure 4, so that the knob and the heart-shaped cup then become a single dough cutter mold.

The description has properly comprehended, it is believed, the generic aspects of the over-all structural means as well as the somewhat independent species adaptations thereof. The fact that the heart-shaped cup 30 in Figure 3 can be rotated or not rotated relative to the larger outer cup or mold 6a is merely a "functional" difference between the structure appearing in Figures 1 and 2, on the one hand, and Figure 3 on the other. Also, in all forms of the invention there will be found an inner cup with a centered pin or axle and a finger actuated operating knob detachably mounted thereon, preferably a knob which is cruciform in configuration, said knob serving to operate the dislodging and releasing means, that is, the inner cutter-mold. Under ordinary circumstances a quarter of a turn of the knob is all that is required to dislodge, release and "drop" the outer ring-like portion of the food product from the outer cup mold.

It will be clear from the disclosure that the invention may be used alone as revealed in the drawings and description or employed in connection with the meat patty maker covered in United States Patent 2,631,331 granted to me on March 17, 1953. That is to say, the relatively small auxiliary or inner cup mold may be used to replace the bladed cutter of the meat patty maker. Generally the circular mold is used although the non-circular ornamental mold may, of course, be used. In either event the integral turning pin is fitted removably and rotatably in the bearing hole provided after the bladed cutter has been removed. The same cruciform knob is used for clampingly and rotatably maintaining the parts in assembled relationship. The rim of the inner cup mold is spaced concentrically from the rim of the outer mold so that there is an intervening space from which the dough or accumulated food material is dislodged, that is when the knob and inner cup mold turn as a unit relative to the outer mold. Thus, with my inventions one may have a meat patty maker or a doughnut cutting mold with proper dislodging and releasing means for the product. With the non-circular or ornamental auxiliary inner cup mold cooperatively functioning with the outer cup mold, two distinct portions of the dough can be cut simultaneously for making two-color inlaid cookies.

Minor changes in the shape, size, materials and arrangement of parts may be resorted to in actual practice without departing from the spirit and scope of the invention, as claimed.

Having described the invention, what is claimed as new is:

1. A doughnut cutter molding and dislodging device comprising a rigid outer cup mold embodying a flat circular top having an endless lateral marginal flange extending laterally from one side of said top and a one-piece rigid loop-shaped handle extending laterally from the other side of said top and having end portions connected with diametrically opposite marginal portions of said top, the intermediate portion of said handle bridging over said other side in spaced relation thereto and providing a hand-grip, said top being provided centrally with a bearing hole located directly beneath the central portion of said hand-grip, product contacting, dislodging, and releasing means comprising a relatively small inner cup mold, the latter being adapted to function as a doughnut cutter and being mounted for rotation within the confines of said outer cup mold and being provided centrally with an integral pin fitted removably and rotatably in and extending upwardly through the bearing hole and above the top of the outer cup mold, and a one-piece finger actuated knob removably keyed on the upper end of said pin and situated for free rotation in the space between said top and intermediate portion of said hand-grip directly beneath and spaced downwardly from the underside of said intermediate portion, said knob and cooperating pin constituting means for clampingly and rotatably maintaining the two cup molds in assembled relationship and permitting the inner cup mold to be removed if desired, and said knob being cruciform and also having four finger actuatable trip elements projecting radially from the periphery of the knob and being operable in a step-by-step manner to advance the knob one-quarter turn as each trip element is actuated, said trip elements projecting to positions beyond adjacent portions of said hand-grip so that when one trip element is engaged and advanced one step and next succeeding trip element is brought into an accessible position for the next operation of said knob and cutter, whereby the user may conveniently catch hold of the hand-grip and, while holding the latter, may reach down and toward said knob with a single finger or the thumb and engage the tip thereof slidingly with a conveniently situated one of said trip elements and so that by imparting an approximate quarter-turn to said knob, said inner cup mold becomes effective to loosen the dough, admit air into the outer mold, and to release the portion of dough lodged between the cooperating marginal flange portions of the respective molds.

2. A doughnut cutter, molding, and dislodging device comprising a rigid outer cup mold embodying a circular top having an endless lateral marginal flange with a thinned cutting lip extending from one side, a one-piece rigid loop-shaped handle extending from the other side and having end portions connected with diametrically opposite portions of said top, the intermediate portion of said handle bridging over said other side in spaced relation thereto and providing a hand-grip, said top being provided centrally with a bearing hole located directly beneath the central portion of said hand-grip, a relatively small auxiliary inner cup mold functioning in conjunction with said outer mold in a manner to cut two distinct portions of dough simultaneously for doughnuts or two-color cookies, said inner cup mold also functioning as product contacting, dislodging and releasing means, being mounted for rotation within the confines of the outer cup mold and being provided centrally with an integral pin fitted removably and rotatably in and extending upwardly through the bearing hole and above the top of said outer cup mold, and a one-piece finger actuated knob removably keyed on the upper end of said pin and situated for free rotation in the space between said top and hand-grip directly beneath and spaced downwardly from the underside of said hand-grip, said knob constituting means for clampingly and rotatably maintaining the two cup molds in assembled relationship and permitting the inner cup mold to be removed from the outer cup mold if desired, and said knob being cruciform and also having four finger actuatable trip elements projecting radially from the periphery of the knob and being operable in a step-by-step manner to advance the knob one-quarter turn as each trip element is actuated so that when one trip element is engaged and advanced one step the next succeeding trip element is brought into an accessible position for the next operation of said knob and said product contacting, dislodging and releasing inner cup mold, whereby the user may conveniently catch hold of the hand-grip and, while holding the latter, may reach down toward the top of said outer cup mold with a single finger or the thumb and engage the tip thereof slidingly with a conveniently situated one of said trip elements and so that by imparting an approximate quarter-turn to said knob, said inner cup mold becomes effective to loosen the dough, admit air into the outer mold and release the portion of dough lodged between the cooperating flange portions of the respective molds.

References Cited in the file of this patent

UNITED STATES PATENTS

| Number | Name | Date |
|---|---|---|
| 176,217 | Collins | Apr. 18, 1876 |
| 520,917 | Eggeling | June 5, 1894 |
| 865,628 | Carsley | Sept. 10, 1907 |
| 978,790 | Thomas | Dec. 13, 1910 |
| 1,459,296 | Stambaugh | June 19, 1923 |
| 2,290,249 | Piperoux | July 21, 1942 |
| 2,332,595 | Paquette | Oct. 26, 1943 |
| 2,415,976 | Thorud | Feb. 18, 1947 |
| 2,631,331 | Babbitt | Mar. 17, 1953 |

FOREIGN PATENTS

| Number | Country | Date |
|---|---|---|
| 22,031 | Sweden | Feb. 23, 1907 |